US011989630B2

(12) United States Patent
Holboke et al.

(10) Patent No.: US 11,989,630 B2
(45) Date of Patent: May 21, 2024

(54) SECURE MULTI-USER MACHINE LEARNING ON A CLOUD DATA PLATFORM

(71) Applicant: Snowflake Inc., Bozeman, MT (US)

(72) Inventors: Monica J. Holboke, Toronto (CA); Justin Langseth, Kailua, HI (US); Stuart Ozer, Oakland, CA (US); William L. Stratton, Jr., Atlanta, GA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/162,697

(22) Filed: Jan. 31, 2023

(65) Prior Publication Data

US 2023/0169407 A1 Jun. 1, 2023

Related U.S. Application Data

(63) Continuation of application No. 18/055,248, filed on Nov. 14, 2022, now Pat. No. 11,893,462, which is a
(Continued)

(51) Int. Cl.
 *G06N 3/00* (2023.01)
 *G06F 16/25* (2019.01)
 (Continued)

(52) U.S. Cl.
 CPC .......... *G06N 20/00* (2019.01); *G06F 16/256* (2019.01); *G06F 16/283* (2019.01); *G06F 18/214* (2023.01); *G06F 21/6227* (2013.01)

(58) Field of Classification Search
 CPC ... G06N 20/00; G06F 21/6227; G06F 16/256; G06F 16/283
 See application file for complete search history.

(56) References Cited

U.S. PATENT DOCUMENTS 7,499,917 B2 3/2009 Purcell et al.
9,235,813 B1 1/2016 Qian et al.
(Continued)

OTHER PUBLICATIONS

Hesamifard, Ehsan, et al. "Privacy-preserving machine learning as a service." Proc. Priv. Enhancing Technol. Mar. 2018 (2018): 123-142. (Year: 2018).*
(Continued)

*Primary Examiner* — Syed A Zaidi
(74) *Attorney, Agent, or Firm* — Schwegman Lundberg & Woessner, P.A.

(57) ABSTRACT

A system for providing access to a database management system (DBMS) to a first user of a cloud data platform, the DBMS being generated by a second user. A machine learning model for training on a training dataset is included in the DBMS. The training dataset includes a first training dataset that is encrypted in the DBMS and a second training dataset that includes non-overlapping features with the first training dataset. A request, from the second user, to train the machine learning model on the first and second training datasets is identified. A trained machine learning model is generated by training the machine learning model on a joined dataset according to the request. One or more outputs from the trained machine learning model are generated by applying the trained machine learning model on new data.

30 Claims, 7 Drawing Sheets

Related U.S. Application Data continuation of application No. 17/644,732, filed on Dec. 16, 2021, now Pat. No. 11,501,015, which is a continuation of application No. 17/232,859, filed on Apr. 16, 2021, now Pat. No. 11,216,580.

(60) Provisional application No. 63/160,306, filed on Mar. 12, 2021.

(51) Int. Cl.

| | | |
|---|---|---|
| *G06F 16/28* | (2019.01) | |
| *G06F 18/214* | (2023.01) | |
| *G06F 21/62* | (2013.01) | |
| *G06N 20/00* | (2019.01) | |

(56) References Cited

U.S. PATENT DOCUMENTS

| | | | |
|---|---|---|---|
| 10,223,417 B1 | 3/2019 | Sirin et al. | |
| 10,303,688 B1 | 5/2019 | Sirin et al. | |
| 10,621,164 B1 | 4/2020 | Kain | |
| 11,216,580 B1 | 1/2022 | Holboke et al. | |
| 11,269,911 B1 | 3/2022 | Jones et al. | |
| 11,501,015 B2 | 11/2022 | Holboke et al. | |
| 11,636,497 B1 * | 4/2023 | Talvola | G06N 20/20 705/7.29 |
| 11,816,539 B1 * | 11/2023 | Granson | G06N 5/01 |
| 2013/0290223 A1 * | 10/2013 | Chapelle | G06N 20/00 706/12 |
| 2014/0207765 A1 | 7/2014 | Haws et al. | |
| 2015/0310195 A1 * | 10/2015 | Bailor | G06F 21/45 726/6 |
| 2016/0092794 A1 | 3/2016 | Qian et al. | |
| 2016/0210534 A1 * | 7/2016 | Padubrin | G06N 7/01 |
| 2017/0070842 A1 | 3/2017 | Kulp et al. | |
| 2017/0364694 A1 | 12/2017 | Jacob et al. | |
| 2017/0372226 A1 * | 12/2017 | Costa | G06F 21/6245 |
| 2018/0081912 A1 * | 3/2018 | Suleiman | G06F 16/215 |
| 2018/0084010 A1 | 3/2018 | Joseph et al. | |
| 2018/0167402 A1 * | 6/2018 | Scheidler | G06N 20/00 |
| 2018/0247648 A1 * | 8/2018 | Nadimpalli | G10L 15/22 |
| 2019/0020477 A1 * | 1/2019 | Antonatos | H04L 9/0894 |
| 2019/0354621 A1 | 11/2019 | Wang et al. | |
| 2020/0073986 A1 | 3/2020 | Purcell et al. | |
| 2021/0141796 A1 | 5/2021 | Shah et al. | |
| 2021/0279357 A1 | 9/2021 | Das et al. | |
| 2021/0377718 A1 | 12/2021 | Ben Ari et al. | |
| 2022/0292213 A1 | 9/2022 | Holboke et al. | |
| 2023/0161961 A1 * | 5/2023 | Picinini | G06F 16/9538 715/230 |
| 2023/0186160 A1 | 6/2023 | Holboke et al. | |

OTHER PUBLICATIONS

NPL Search Terms (Year: 2023).*
Liu, Fang, et al. "Encrypted set intersection protocol for outsourced datasets." 2014 IEEE International Conference on Cloud Engineering. IEEE, 2014. (Year: 2014).*
Gupta, Otkrist, and Ramesh Raskar. "Distributed learning of deep neural network over multiple agents." Journal of Network and Computer Applications 116 (2018): (Year: 2018).*
NPL Search Terms (Year: 2024).*
Graepel, Thore, Kristin Lauter, and Michael Naehrig. "ML confidential: Machine learning on encrypted data." International conference on information security and cryptology. Berlin, Heidelberg: Springer Berlin Heidelberg, 2012. (Year: 2012).*
"U.S. Appl. No. 17/232,859, Non Final Office Action dated Jun. 28, 2021", 15 pgs.
"U.S. Appl. No. 17/232,859, Notice of Allowance dated Oct. 26, 2021", 9 pgs.
"U.S. Appl. No. 17/232,859, Response filed Sep. 28, 2021 to Non Final Office Action dated Jun. 28, 2021", 9 pgs.
"U.S. Appl. No. 17/644,732, 312 Amendment Filed Sep. 28, 2022", 7 pgs.
"U.S. Appl. No. 17/644,732, Non Final Office Action dated Mar. 9, 2022", 19 pgs.
"U.S. Appl. No. 17/644,732, Notice of Allowance dated Jun. 29, 2022", 10 pgs.
"U.S. Appl. No. 17/644,732, PTO Response to Rule 312 Communication dated Jan. 7, 2022", 2 pgs.
"U.S. Appl. No. 17/644,732, Response filed Jun. 9, 2022 to Non Final Office Action dated Mar. 9, 2022", 11 pgs.
"NPL Search Terms", (2022).
"NPL Search Terms", (2021).
Fang, Y, et al., "Accelerating raw data analysis with the accorda software and hardware architecture", Proceedings of the VLDB Endowment, 12(11), (Jul. 1, 2019), 1568-82.
Kraska, Tim, et al., "SageDB A Learned Database System", In 9th Biennial Conference on Innovative Data Systems Research, (2019).
U.S. Appl. No. 17/232,859 U.S. Pat. No. 11,216,580, filed Aug. 16, 2021, Secure Machine Learning Using Shared Data in a Distributed Database.
U.S. Appl. No. 17/644,732 U.S. Pat. No. 11,501,015, filed Dec. 16, 2021, Secure Machine Learning Using Shared Data in a Distributed Database.
U.S. Appl. No. 18/055,248, filed Nov. 14, 2022, Machine Learning Using Secured Shared Data.
"U.S. Appl. No. 18/055,248, Examiner Interview Summary dated Jul. 20, 2023", 2 pgs.
"U.S. Appl. No. 18/055,248, Final Office Action dated Jul. 27, 2023", 19 pgs.
"U.S. Appl. No. 18/055,248, Non Final Office Action dated Apr. 18, 2023", 20 pgs.
"U.S. Appl. No. 18/055,248, Response filed Jul. 18, 2023 to Non Final Office Action dated Apr. 18, 2023", 15 pgs.
"U.S. Appl. No. 18/055,248, Notice of Allowance mailed Nov. 29, 2023", 10 pgs.
"U.S. Appl. No. 18/055,248, Response filed Oct. 25, 2023 to Final Office Action mailed Jul. 27, 2023", 14 pgs.
"U.S. Appl. No. 18/055,248, Supplemental Notice of Allowability mailed Dec. 6, 2023", 2 pgs.
"NPL Search Terms (Year: 2023)", (2023).

* cited by examiner

SECURE MULTI-USER MACHINE LEARNING ON A CLOUD DATA PLATFORM

CROSS-REFERENCE TO RELATED APPLICATIONS

This application is a Continuation of U.S. patent application Ser. No. 18/055,248 filed Nov. 14, 2022, which is a Continuation of U.S. patent application Ser. No. 17/644,732, filed Dec. 16, 2021, which is a Continuation of U.S. patent application Ser. No. 17/232,859, filed on Apr. 16, 2021 and issued on Jan. 4, 2022 as U.S. Pat. No. 11,216,580, which claims the benefit of priority to U.S. Provisional Patent Application Ser. No. 63/160,306, filed Mar. 12, 2021, the contents of which are incorporated by reference herein in their entireties.

TECHNICAL FIELD

Embodiments of the disclosure relate generally to a network-based database system or a cloud data platform and, more specifically, to implementing models on data shared between database users in a secure manner.

BACKGROUND

Cloud-based data warehouses and other database systems provide users an ability to track and manage large amounts of data. While different users can manage their datasets, it is difficult and often not practical to share the data to create machine learning models due to technical complexity, scaling issues, energy inefficiencies, network overhead, and privacy reasons.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed, it can be difficult for different users to create machine learning models that is trained on their respective datasets. Previous approaches attempted to solve the issue by using trusted intermediaries, complex encryption schemes, however these approaches are complex, costly, slow to implement. To this end, a secure machine learning system can be implemented that can use raw or aggregated data from multiple parties to train a machine learning model in a distributed database system without revealing the training data to the different parties. In some example embodiments, a first user of the database can share data in an encrypted view with a second user of the database, and further share one or more functions of an application that accesses the data while the data is encrypted. The second user can access functions of the application and can call the functions to generate a trained machine learning model and generate machine learning outputs from the trained model. In this way, users of the secure machine learning system can receive shared information to build and operate the model without seeing or requiring access to the underlying data.

Figure 1:
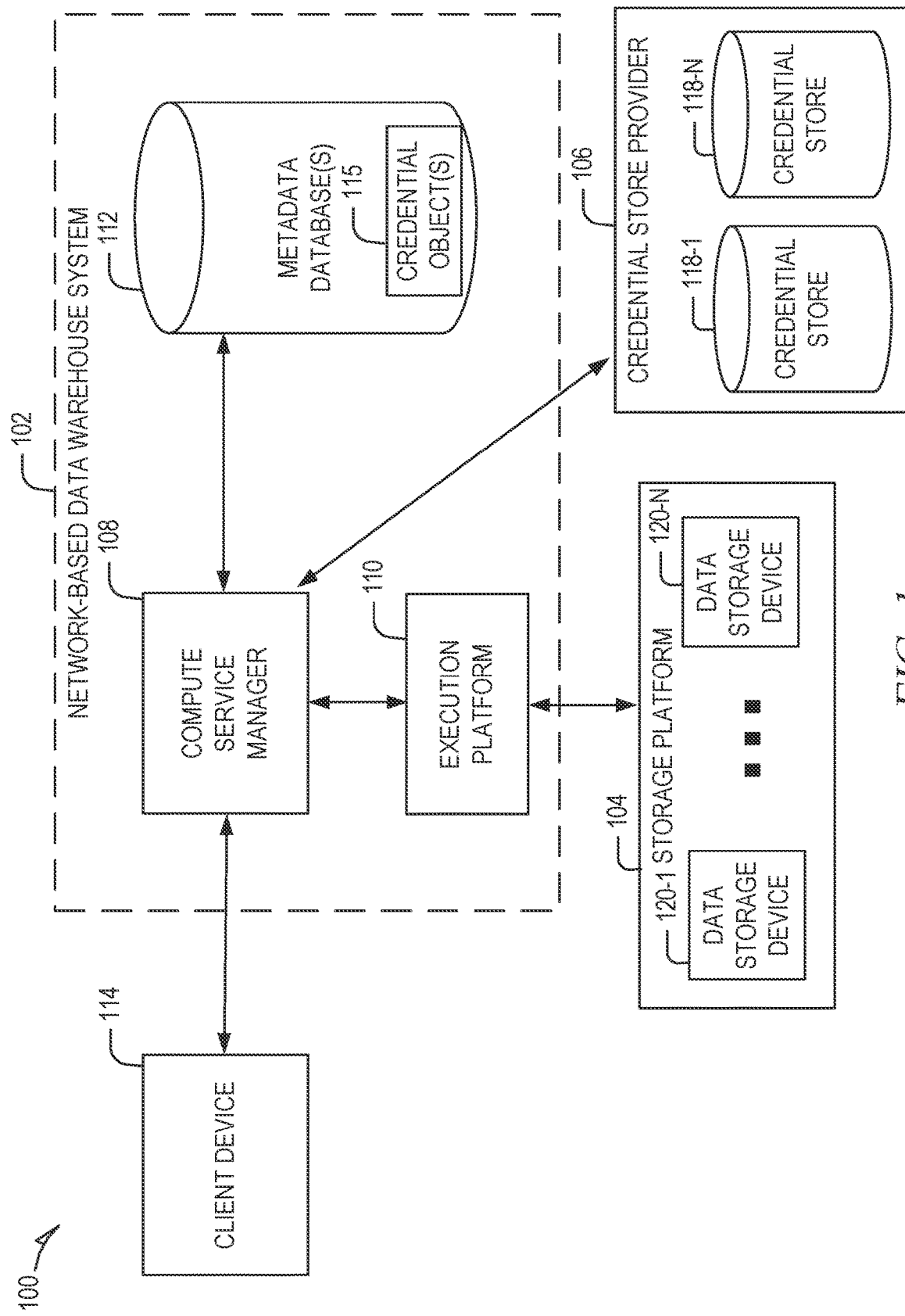
FIG. 1 illustrates an example computing environment that includes a network-based data warehouse system in communication with a cloud storage platform, in accordance with some embodiments of the present disclosure.

FIG. 1 illustrates an example computing environment 100 that includes a database system in the example form of a network-based data warehouse system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based data warehouse system 102 in communication with a cloud storage platform 104 (e.g., AWS®, Microsoft Azure Blob Storage®, or Google Cloud Storage), and a cloud credential store provider 106. The network-based data warehouse system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data warehouse system 102.

The network-based data warehouse system 102 comprises a compute service manager 108, an execution platform 110, and one or more metadata databases 112. The network-based data warehouse system 102 hosts and provides data reporting and analysis services to multiple client accounts.

The compute service manager 108 coordinates and manages operations of the network-based data warehouse system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data warehouse system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based data warehouse system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the cloud credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3TM storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data warehouse system 102. Thus, in the described embodiments, the network-based data warehouse system 102 is dynamic and supports regular changes to meet the current data processing needs.

During typical operation, the network-based data warehouse system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
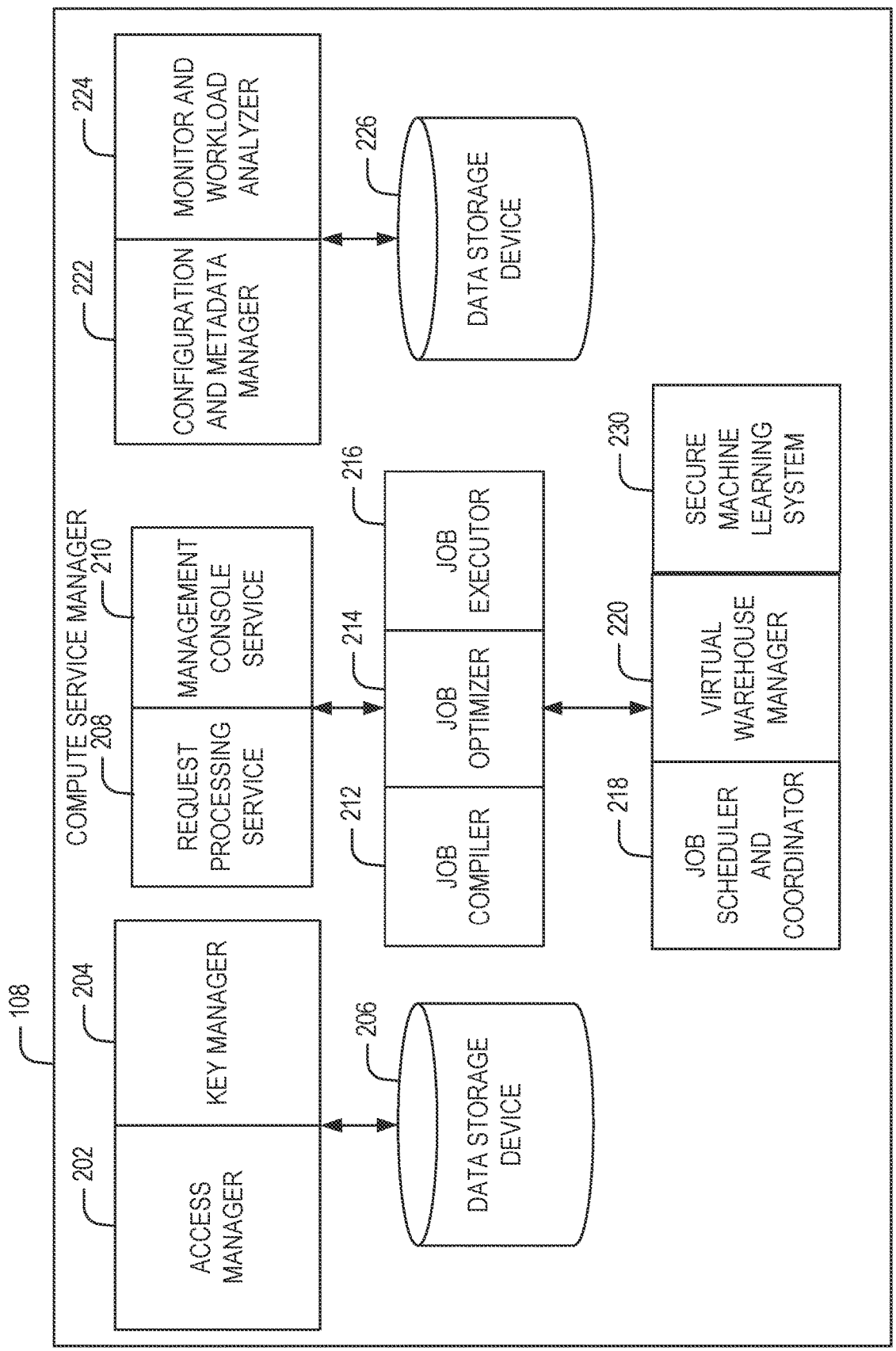
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The secure machine learning system 230 is configured to manage sharing data and functions between multiple users of the database in a secure and efficient manner, as discussed in further detail below.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data warehouse system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based data warehouse system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
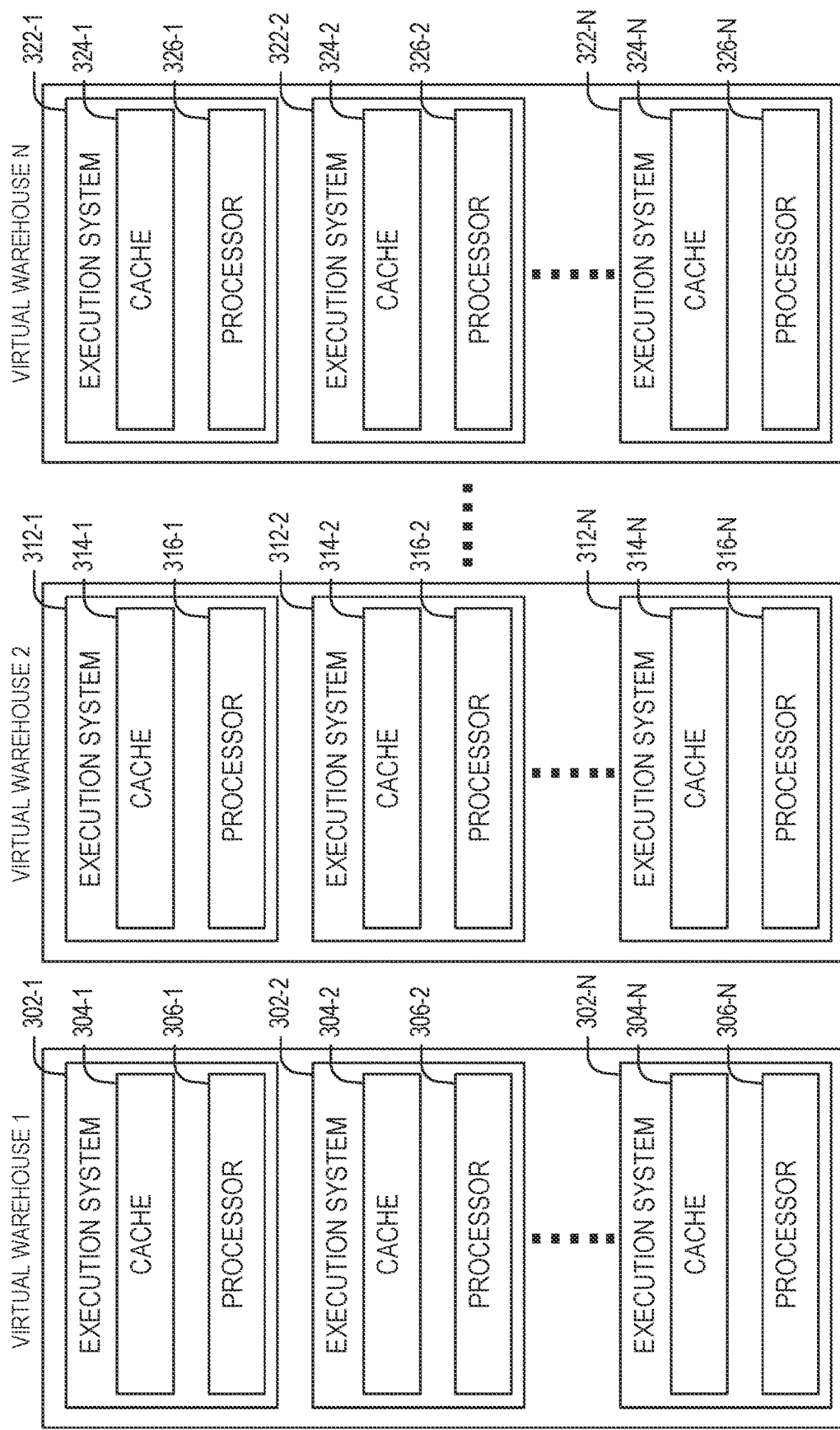
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-tinge based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-*n*. Execution node 302-1 includes a cache 304-1 and a processor 306-1. Execution node 302-2 includes a cache 304-2 and a processor 306-2. Execution node 302-*n* includes a cache 304-*n* and a processor 306-*n*. Each execution node 302-1, 302-2, and 302-*n* is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-*n*. Execution node 312-1 includes a cache 314-1 and a processor 316-1. Execution node 312-2 includes a cache 314-2 and a processor 316-2. Execution node 312-*n* includes a cache 314-*n* and a processor 316-*n*. Additionally, virtual warehouse 3 includes three execution nodes 322-1, 322-2, and 322-*n*. Execution node 322-1 includes a cache 324-1 and a processor 326-1. Execution node 322-2 includes a cache 324-2 and a processor 326-2. Execution node 322-*n* includes a cache 324-*n* and a processor 326-*n*.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change aver time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-*n* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
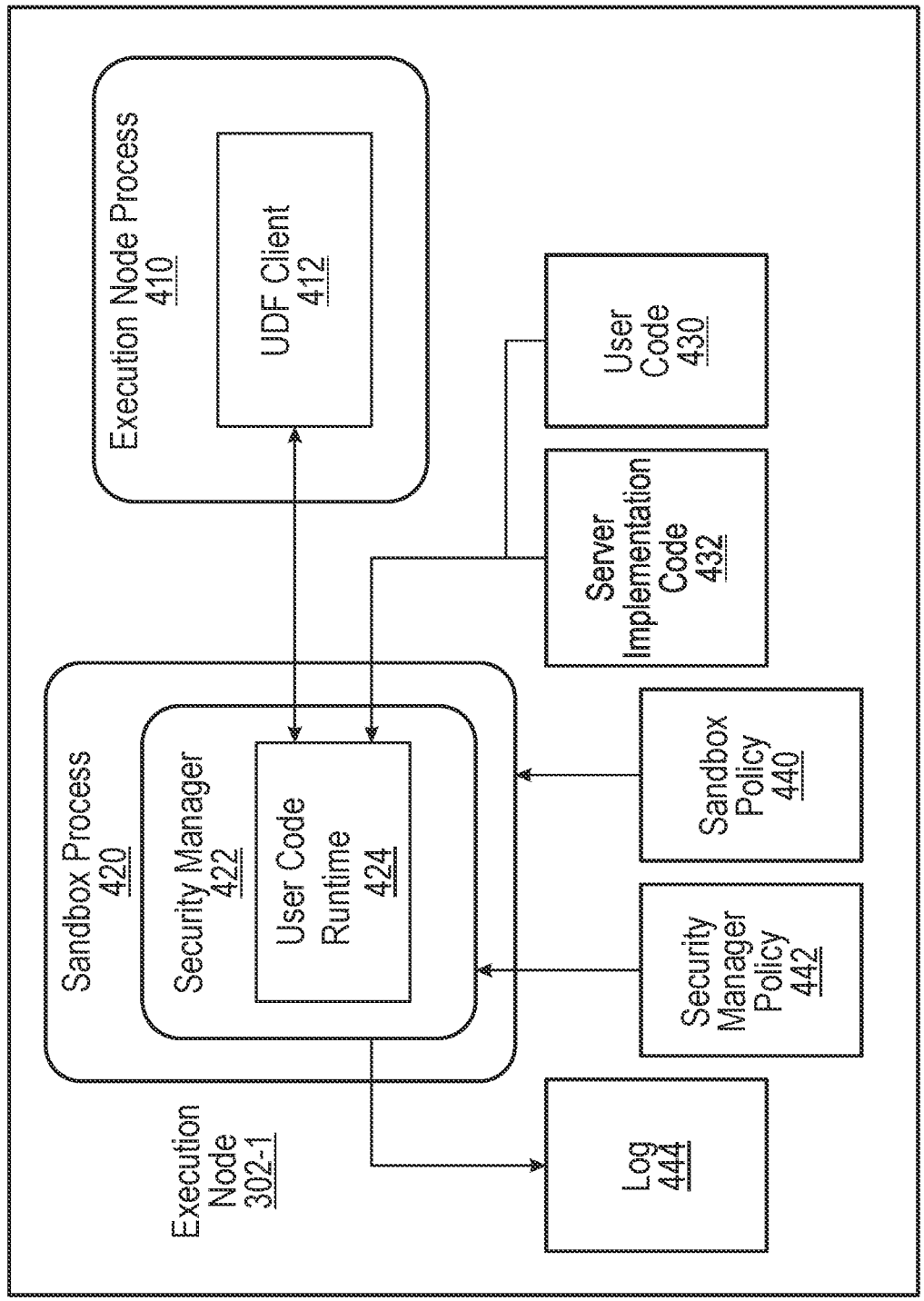
FIG. 4 is a computing environment conceptually illustrating an example software architecture executing a user defined function (UDF) by a process running on a given execution node of the execution platform, in accordance with some embodiments of the present disclosure.

FIG. 4 is a computing environment 400 conceptually illustrating an example software architecture executing a user defined function (UDF) by a process running on a given execution node of the execution platform 110, in accordance with some embodiments of the present disclosure.

As illustrated, the execution node 302-1 from the execution platform 110 includes an execution node process 410, which in an embodiment is running on the processor 3061 and can also utilize memory from the cache 304-1 (or another memory device or storage). As mentioned herein, a "process" or "computing process" can refer to an instance of a computer program that is being executed by one or more threads by an execution node or execution platform.

As mentioned before, the compute service manager 108 validates all communication from the execution platform 110 to validate that the content and context of that communication are consistent with the task(s) known to be assigned to the execution platform 110. For example, the execution platform 110 executing a query A is not allowed to request access to a particular data source (e.g., data storage device 226 or any one of the storage devices in the cloud storage platform 104) that is not relevant to query A. In an example, the execution node 302-1 may need to communicate with a second execution node (e.g., execution node 302-2), but the security mechanisms described herein can disallow communication with a third execution node (e.g., execution node 312-1). Moreover, any such illicit communication can be recorded (e.g., in a log 444 or other location). Further, the information stored on a given execution node is restricted to data relevant to the current query and any other data is unusable by destruction or encryption where the key is unavailable.

The execution node process 410 is executing a UDF client 412 in the example of FIG. 4. In an embodiment, the UDF client 412 is implemented to support UDFs written in a particular programming language such as JAVA, and the like. In an embodiment, the UDF client 412 is implemented in a different programming language (e.g., C or C++) than the user code 430, which can further improve security of the computing environment 400 by using a different codebase (e.g., one without the same or fewer potential security exploits).

User code 430 may be provided as a package e.g., in the form of a JAR (JAVA archive) file which includes code for one or more UDFs. Server implementation code 432, in an embodiment, is a JAR file that initiates a server which is responsible for receiving requests from the execution node process 410, assigning worker threads to execute user code, and returning the results, among other types of server tasks.

In an implementation, an operation from a UDF (e.g., JAVA based UDF) can be performed by a user code runtime 424 executing within a sandbox process 420 (described further below). In an embodiment, the user code runtime 424 is implemented as a virtual machine, such as a JAVA virtual machine (JVM). Since the user code runtime 424 advantageously executes in a separate process relative to the execution node process 410, there is a lower risk of manipulating the execution node process 410. Results of performing the operation, among other types of information or messages, can be stored in a log 444 for review and retrieval. In an embodiment, the log 444 can be stored locally in memory at the execution node 302-1, or at a separate location such as the storage platform 104. Moreover, such results can be returned from the user code runtime 424 to the UDF client 412 utilizing a high-performance protocol (e.g., without serialization or deserialization of data, without memory copies; operates on record batches without having to access individual columns, records or cells; utilizes efficient remote procedure call techniques and network protocol(s) for data transfer (e.g., distributed datasets) that further provides authentication and encryption of the data transfer. In an embodiment, the UDF client 412 uses a data transport mechanism that supports a network transfer of columnar data between the user code runtime 424 (and vice-versa) with the aforementioned advantages described above.

The security manager 422, in an example, can prevent completion of an operation from a given UDF by throwing an exception (e.g., if the operation is not permitted), or returns (e.g., doing nothing) if the operation is permitted. In an implementation, the security manager 422 is implemented as a JAVA security manager object that allows applications to implement a security policy such as a security manager policy 442, and enables an application to determine, before performing a possibly unsafe or sensitive operation, what the operation is and whether it is being attempted in a security context that allows the operation to be performed. The security manager policy 442 can be implemented as a file with permissions that the user code runtime 424 is granted. The application (e.g., UDF executed by the user code runtime 424) therefore can allow or disallow the operation based at least in part on the security policy.

Sandbox process 420, in an embodiment, is a sub-process (or separate process) from the execution node process 410. A sub-process, in an embodiment, refers to a child process of a given parent process (e.g., in this example, the execution node process 410). The sandbox process 420, in an example, is a program that reduces the risk of security breaches by restricting the running environment of untrusted applications using security mechanisms such as namespaces and secure computing modes (e.g., using a system call filter to an executing process and all its descendants, thus reducing the attack surface of the kernel of a given operating system). Moreover, in an example, the sandbox process 420 is a lightweight process in comparison to the execution node process 410 and is optimized (e.g., closely coupled to security mechanisms of a given operating system kernel) to process a database query in a secure manner within the sandbox environment.

In an embodiment, the sandbox process 420 can utilize a virtual network connection in order to communicate with other components within the subject system. A specific set of rules can be configured for the virtual network connection with respect to other components of the subject system. For example, such rules for the virtual network connection can be configured for a particular UDF to restrict the locations (e.g., particular sites on the Internet or components that the UDF can communicate) that are accessible by operations performed by the UDF. Thus, in this example, the UDF can be denied access to particular network locations or sites on the Internet.

The sandbox process 420 can be understood as providing a constrained computing environment for a process (or processes) within the sandbox, where these constrained processes can be controlled and restricted to limit access to certain computing resources.

Examples of security mechanisms can include the implementation of namespaces in which each respective group of processes executing within the sandbox environment has access to respective computing resources (e.g., process IDs, hostnames, user IDs, file names, names associated with network access, and inter-process communication) that are not accessible to another group of processes (which may have access to a different group of resources not accessible by the former group of processes), other container implementations, and the like. By having the sandbox process 420 execute as a sub-process to the execution node process 410, in some embodiments, latency in processing a given database query can be substantially reduced (e.g., a reduction in latency by a factor of 10× in some instances) in comparison with other techniques that may utilize a virtual machine solution by itself.

As further illustrated, the sandbox process 420 can utilize a sandbox policy 440 to enforce a given security policy. The sandbox policy 440 can be a file with information related to a configuration of the sandbox process 420 and details regarding restrictions, if any, and permissions for accessing and utilizing system resources. Example restrictions can include restrictions to network access, or file system access (e.g., remapping file system to place files in different locations that may not be accessible, other files can be mounted in different locations, and the like). The sandbox process 420 restricts the memory and processor (e.g., CPU) usage of the user code runtime 424, ensuring that other operations on the same execution node can execute without running out of resources.

As mentioned above, the sandbox process 420 is a sub-process (or separate process) from the execution node process 410, which in practice means that the sandbox process 420 resides in a separate memory space than the execution node process 410. In an occurrence of a security breach in connection with the sandbox process 420 (e.g., by errant or malicious code from a given UDF), if arbitrary memory is accessed by a malicious actor, the data or information stored by the execution node process is protected.

Although the above discussion of FIG. 4 describes components that are implemented using JAVA (e.g., object oriented programming language), it is appreciated that the other programming languages (e.g., interpreted programming languages) are supported by the computing environment 400. In an embodiment, PYTHON is supported for implementing and executing UDFs in the computing environment 400. In this example, the user code runtime 424 can be replaced with a PYTHON interpreter for executing operations from UDFs (e.g., written in PYTHON) within the sandbox process 420.

Figure 5:
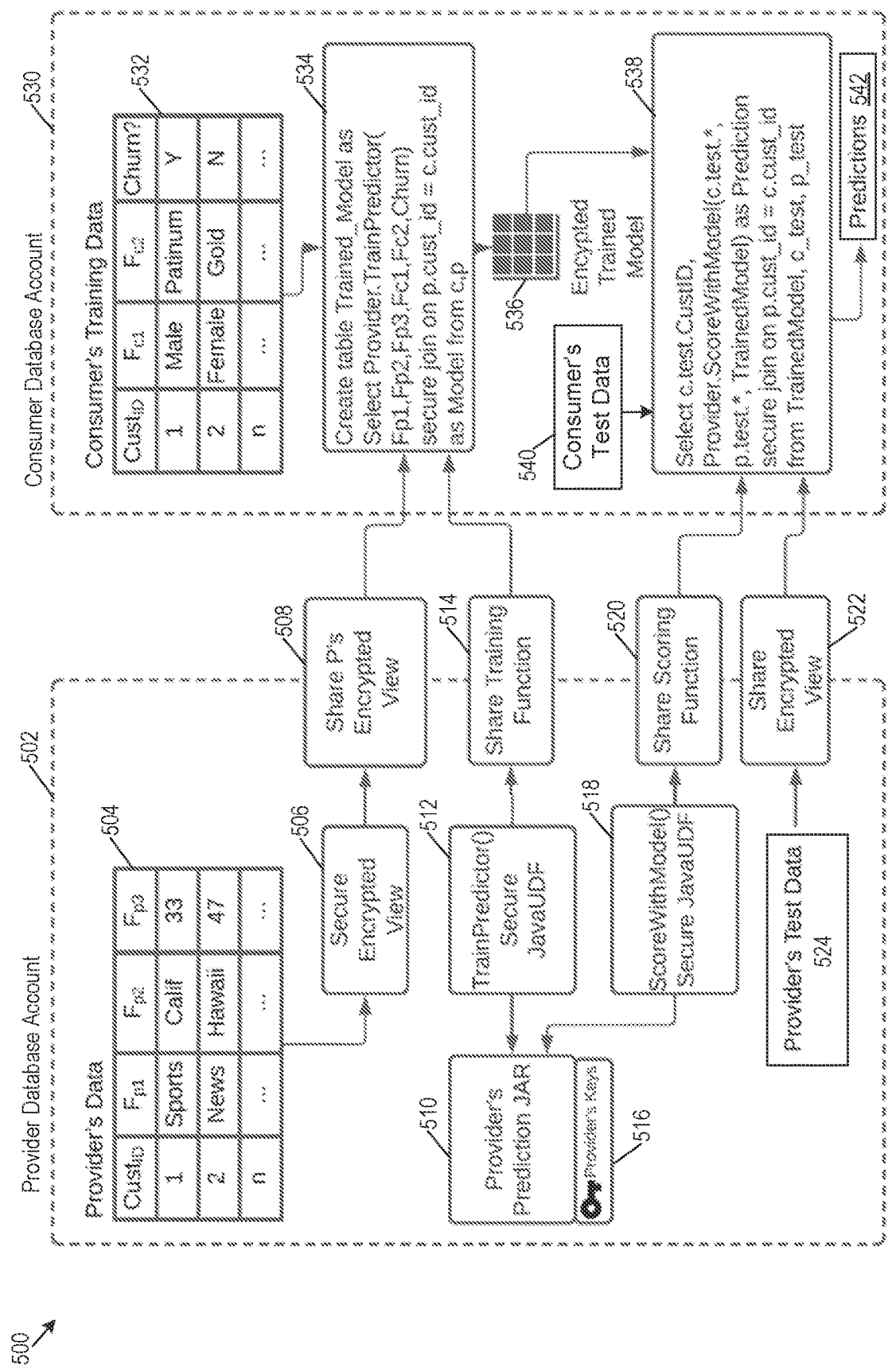
FIG. 5 shows a multi-party machine learning architecture, according to some example embodiments.

FIG. 5 shows a multi-party machine learning architecture 500, according to some example embodiments. In the example illustrated, two database accounts are illustrated including a provider database account 502 and a consumer database account 530. The two user accounts correspond to different entities (e.g., database accounts, different companies, different organizations). Each account stores and manages its own data. For example, the provider database account 502 stores and manages provider data 504 and the consumer database account 530 stores and manages consumer data 532 (e.g., data tracking about each parties' respective customers). For example, each of the provider data 504 and consumer data 532 can be different columns of data for a same set of users, where for example the provider data 504 includes a first column $F_{p1}$ for user interests, a second column $F_{p2}$ for user location, and $F_{p3}$ for user age; and the consumer data 532 includes a first column $F_{c1}$ for the user sex, the column $F_{c2}$ for user subscription or membership (e.g., network service subscription, membership level, service level agreement (SLA), etc.), and a third column for churn that tracks how often a given user churns or leaves a given group, program, or sub-set of users (e.g., cancels a subscription to a network service). The provider database account 502 and the consumer database account 530 can seek to generate a machine learning model based on a join and/or aggregation of each other's respective information, where learning from features of data in each data set (e.g., provider data 504 and consumer data 532) can improve the prediction accuracy of the machine learning model. For example, the multi-party machine learning architecture 500 can be used to generate a machine learning model to predict the churn of the customers, where the provider and consumer accounts collect, track, or otherwise manage different facets about the customers. The trained machine learning model can be used to predict future churn likelihood for a given user (e.g., potential churn for an existing customer, potential churn for a new customer or candidate).

In some example embodiments, the provider database account 502 shares the provider data 504 in a secure encrypted view 506, which is then exposed as an encrypted data share object 508 that can be accessed by the consumer database account 530. The consumer database account 530 can issue a training statement to create a training runtime instance 534, which securely joins the provider data 504 and consumer data 532, and trains the model on a union of features from both sets of data as specified by the training function, without decrypting or exposing the providers underlying data to the consumer database account 530. Although in the example discussed here, the union of features from the different datasets is implemented to train the model, in some example embodiments, the features between the datasets are the same and the provider shares additional rows of data in the provider data 504, which is used for training by the consumer database account 530 (e.g., the provider data 504 contains a large set of rows (e.g., millions of rows of user data) that provides better signals for training a model than if the consumer database account 530 trained the ML model solely on the consumer data 532).

The secure encrypted view 506 is a database view in which the underlying data is encrypted by a provider key 516 of the provider database account 502. Further details on securely sharing and joining data from the provider data 504 and consumer data 532 is discussed in U.S. patent application Ser. No. 16/944,929, entitled "Data Clean Room," filed on Jul. 31, 2020, and in U.S. patent application Ser. No. 16/368,339, entitled "Secure Data Joins in a Multiple Tenant Database System," filed on May 28, 2019, which are hereby incorporated in their entirety.

The consumer database account 530 can receive access to the encrypted data share object 508 but cannot see or access the underlying plaintext (e.g., row data), which appears to the consumer account 530 as random noise or strings that are not human decipherable. The provider database account 502 further provides a prediction application package 510 (e.g., compressed application, Java ARchive (JAR), user code 430) which includes a shareable training function 512 and a shareable scoring function 518 (e.g., activation function) which are shared with the consumer database account 530. In some example embodiments, the source code of the prediction application package 510 nor even the shared compiled job application of the prediction application package 510 is shared with the consumer database account 530, rather all that is shared is the ability to create a runtime of code (e.g., user code runtime 424) using a client (e.g., UDF client 412). Further details on sharing functions and secure UDFs are discussed in U.S. patent application Ser. No. 16/945,390, entitled "Secure Code Execution in a Database System," filed on Jul. 31, 2020, which is hereby incorporated in its entirety.

The prediction application package 510 is configured with a machine learning model (e.g., machine learning library, propensity-to-churn model, propensity-to-click model, things called lookalike models). The prediction application package 510 is further configured with integrated provider keys (e.g., provider keys 516, which are stored in the security manager 422, FIG. 4) to access and decrypting the provider data for use in training the model. In some example embodiments, the providers database account 502 uses the format of data from the consumer account (e.g., consumer data 532), which is used to customize the machine learning model for intake and training using the customer data (e.g., upon the consumer calling the exposed functions). In this way, when the consumer database account 530 accesses the training function 512, the column data can be referenced and utilized by the machine learning model which is expecting features or columns of data of a certain type to generate predictions. In other example embodiments, the machine learning model in the prediction application package 510 is untrained or partially trained but still provided in the prediction application package 510 for bootstrap training using the consumer data 532 on the securely joined data.

To initiate training the consumers database account 530 calls the shared training function 512 which generates an encrypted trained model 536. Once trained, the consumer database account 530 calls the scoring function share object 520 that utilizes the encrypted trained model 536 on a secure join of consumer test data 540 from the consumer database account 530 and further provider test data 524 from the provider database account 502 that is shared through an additional share encrypted view 522. The test data can be data that is utilized to fine tune the trained model 536 or further update the model 536 with the latest set of customer data from the respective sources. Upon the consumer database account 530 calling the shared scoring function, a scoring runtime instance 538 is created (e.g., Select statement) that implements the encrypted model 536 to consume a secure join of the consumer test data 540 and 524 to generate predictions 542 (e.g., churn predictions for each customer in the test data set).

Figure 6:
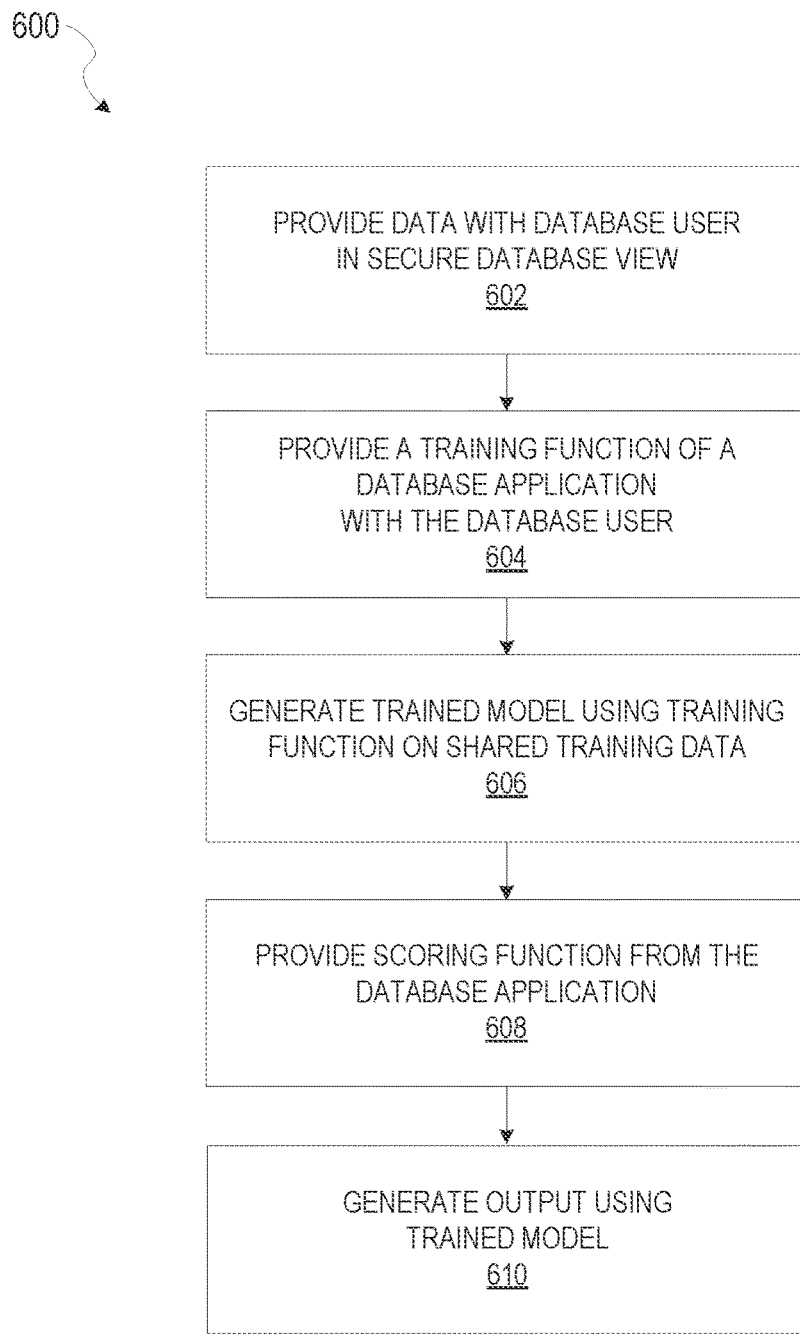
FIG. 6 shows a flow diagram of a method for implementing multiparty secure machine learning on a distributed database, according to some example embodiments.

FIG. 6 shows a flow diagram of a method 600 for implementing multiparty secure machine learning on a distributed database, according to some example embodiments. At operation 602, the secure machine learning system 230 provides data with a database user in a secure database view. For example, at operation 602, the provider database account 502 shares the provider data 504 in a secure encrypted view 506 as an encrypted data share object 508 with the consumer database account 530.

At operation 604, the secure machine learning system 230 provides a training function of a database application with the database user. For example, the provider database account 502 provides access to the consumer database account 530 to call a preconfigured function (e.g., training function 512) of the prediction application package 510.

At operation 606, the system generates a trained model using training function on the shared data. For example, at operation 606, the secure machine learning system 230 shares the training function 512 with the consumer database account 530 as a training function share object 514. Further, a portion of data from the consumer data 532 (e.g., features, column $F_{c1}$ column, $F_{c2}$ column, and churn column) and a portion of the data from the provider data 504 (e.g., column $F_{p1}$ column, $F_{p2}$ column, and $F_{p2}$ column) as specified by training function call (e.g., "create table Trained_Model as Select [ . . . ]"), is joined in a secure join within the consumer database account 530 (e.g., consumer account managed compute instances and decoupled storage devices), and the secure machine learning system 230 cross-references the data from the different accounts to generate an encrypted trained model 536.

At operation 608, the secure machine learning system 230 provides a scoring function from the database application. For example, at operation 608, the secure machine learning system 230 shares the scoring function 518 with the consumer database account 530 as a scoring function share object 520. The consumer database account 530 calls the scoring function (e.g., "Select c.test [ . . . ]" with specified test data inputs) to create a secure join from the shared data (e.g., data test inputs comprising: consumer test data 540 and provider test data 524), and the securely joined data is input into the encrypted trained model 536 to generate machine learning model outputs (e.g., predictions, classifications, object recognition, and the like) at operation 610.

In some example embodiments, the encrypted trained model is stored within one or more decoupled storage instance that are managed by the consumer database account 530 and the consumer database account 530 can call the scoring function on the model multiple times without having to access the trained model through the provider database account 502. In some example embodiments, the encrypted trained model 536 is stored in the provider database account 502 and accessed as a share object with the consumer database account 530 every time the model scoring function is called by the consumer database account 530 (e.g., in a pay per access or ML-output approach, by switching the provider keys or tracking scoring function calls). In some example embodiments, the training data is treated before it is used to train the model (e.g., via k-Anonymity or differential privacy) to obfuscate the data and prevent the unencrypted data from being derived from the model. In some example embodiments, the obfuscation mechanism is implemented in the machine learning scheme itself to prevent exposing data using the model. For example, in some example embodiments, different privacy is integrated in the machine learning algorithm itself such that the data generated by the machine learning model with integrated different privacy cannot be used to derive the encrypted data (e.g., data input into the model).

Figure 7:
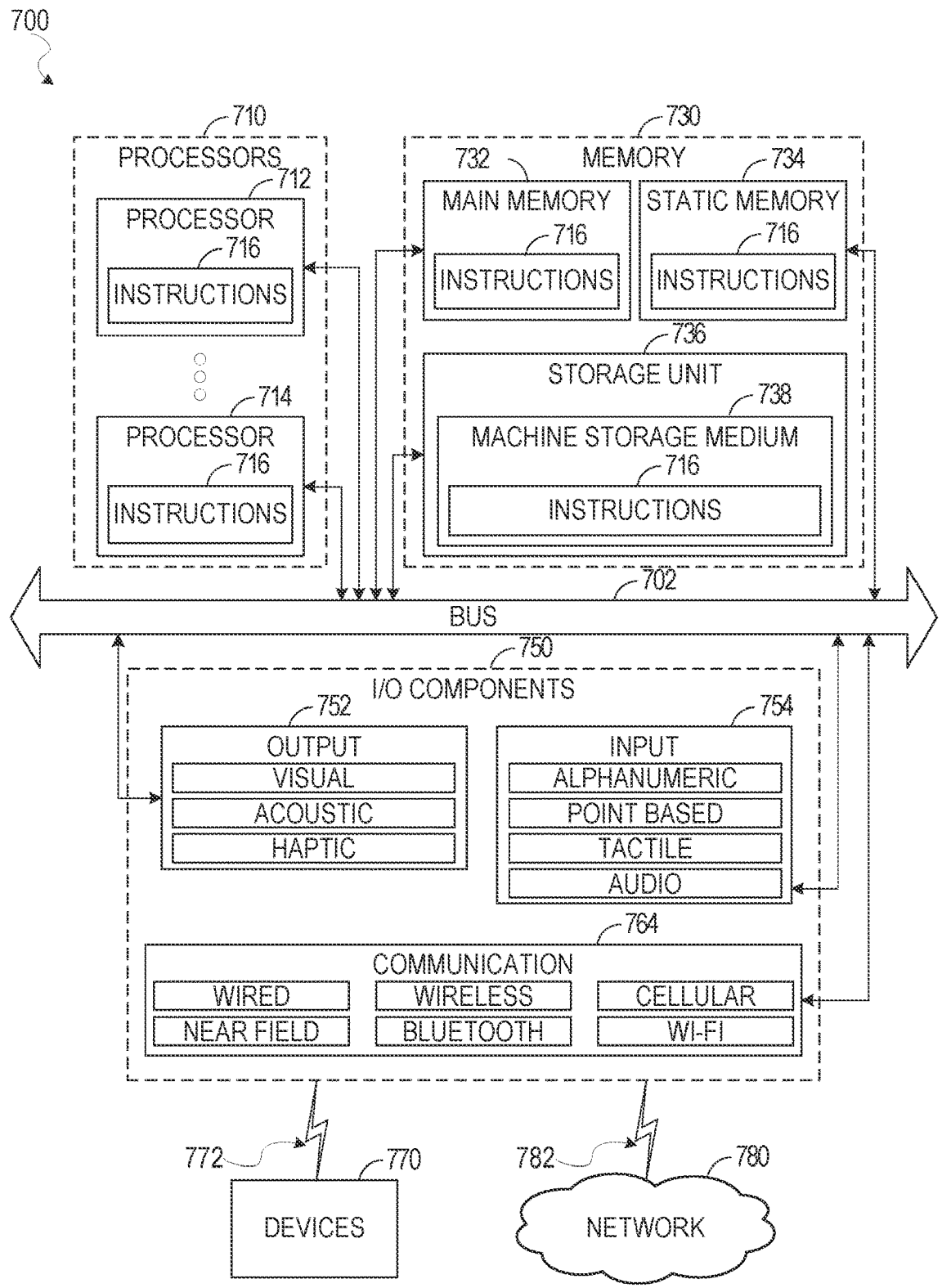
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of the method 600. As another example, the instructions 716 may cause the machine 700 to implement portions of the data flows illustrated in at least FIG. 4. In this way, the instructions 716 transform a general, non-programmed machine into a particular machine 700 (e.g., the compute service manager 108 or a node in the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RTIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within machine storage medium 738 of the storage unit 736, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities. The devices 770 may be another machine or any of a wide variety of peripheral devices (e.g., a peripheral device coupled via a universal serial bus (USB)). For example, as noted above, the machine 700 may correspond to any one of the compute service manager 108 or the execution platform 110, and the devices 770 may include the client device 114 or any other computing device described herein as being in communication with the network-based data warehouse system 102 or the cloud storage platform 104.

Executable Instructions and Machine Storage Medium

The various memories (e.g., 730, 732, 734, and/or memory of the processor(s) 710 and/or the storage unit 736) may store one or more sets of instructions 716 and data structures (e.g., software) embodying or utilized by any one or more of the methodologies or functions described herein.

These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 600 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

The following are example embodiments:

Example 1. A method comprising: sharing, on a distributed database, a database application to a consumer user of the distributed database, the database application generated by a provider user of the distributed database, the database application including a machine learning model for training on a training dataset comprising a provider user training dataset and a consumer user training dataset that include non-overlapping dataset features, the provider user training dataset being encrypted in the database application by an encryption key of the provider user; generating, by the consumer user on the distributed database, a trained machine learning model by training the machine learning model on the provider user training dataset and the consumer user training dataset using the database application, the database application decrypting, using a decryption key, the provider user training data for training the machine learning model; and generating, by the consumer user on the distributed database, one or more outputs from the trained machine learning model by applying the trained machine learning model on new data.

Example 2. The method of example 1, wherein the one or more outputs are predictions generated by the trained machine learning model using the new data.

Example 3. The method of any of examples 1 or 2, wherein the new data comprises data from a provider user account of the provider user on the distributed database and other data from a consumer user account of the consumer user on the distributed database.

Example 4. The method of any of examples 1-3, wherein the consumer user initiates training using a training command that activates the database application on different data portions from the provider user training dataset and the consumer user training dataset.

Example 5. The method of any of examples 1-4, wherein the database application is generated on a provider user set of computing devices on the distributed database that are managed by a provider user account of the provider user.

Example 6. The method of any of examples 1-5, wherein the consumer user manages a consumer user set of computing devices that are separate from the provider user set of computing devices.

Example 7. The method of any of examples 1-6, wherein the provider user training dataset and the consumer user training dataset have different columns of data for rows of the training dataset.

Example 8. The method of any of examples 1-7, wherein the provider user training dataset and the consumer user training dataset have columns of data for columns of the training dataset.

Example 9. The method of any of examples 1-8, wherein the database application comprises a training function that is shared by the provider user with the consumer user to train the machine learning model.

Example 10. The method of any of examples 1-9, wherein the database application comprises an activation function to generate the one or more outputs by applying the trained machine learning model on the new data.

Example 11. The method of any of examples 1-10, wherein the database application is a compressed application is decompressed to share the training function and the activation function with the consumer user on the distributed database.

Example 12. The method of any of examples 1-12, wherein the training function and the activation function are secure user-defined functions that are shared with the consumer user on the distributed database.

Example 13. A system comprising: one or more processors of a machine; and a memory storing instructions that, when executed by the one or more processors, cause the machine to perform operations comprising: sharing, on a distributed database, a database application to a consumer user of the distributed database, the database application generated by a provider user of the distributed database, the database application including a machine learning model for training on a training dataset comprising a provider user training dataset, and a consumer user training dataset that include non-overlapping dataset features, the provider user training dataset being encrypted in the database application by an encryption key of the provider user; generating, by the consumer user on the distributed database, a trained machine learning model by training the machine learning model on the provider user training dataset and the consumer user training dataset using the database application, the database application decrypting, using a decryption key, the provider user training data for training the machine learning model; and generating, by the consumer user on the distributed database, one or more outputs from the trained machine learning model by applying the trained machine learning model on new data.

Example 14. The system of example 13, wherein the one or more outputs are predictions generated by the trained machine learning model using the new data.

Example 15. The system of any of examples 13 or 14, wherein the new data comprises data from a provider user account of the provider user on the distributed database and other data from a consumer user account of the consumer user on the distributed database.

Example 16. The system of any of examples 13-15, wherein the consumer user initiates training using a training command that activates the database application on different data portions from the provider user training dataset and the consumer user training dataset.

Example 17. The system of any of examples 13-16, wherein the database application is generated on a provider user set of computing devices on the distributed database that are managed by a provider user account of the provider user.

Example 18. The system of any of examples 13-17, wherein the consumer user manages a consumer user set of computing devices that are separate from the provider user set of computing devices.

Example 19. The system of any of examples 13-18, wherein the provider user training dataset and the consumer user training dataset have different columns of data for rows of the training dataset.

Example 20. The system of any of examples 13-19, wherein the provider user training dataset and the consumer user training dataset have columns of data for columns of the training dataset.

Example 21. The system of any of examples 13-20, wherein the database application comprises a training function that is shared by the provider user with the consumer user to train the machine learning model.

Example 22. The system of any of examples 13-21, wherein the database application comprises an activation function to generate the one or more outputs by applying the trained machine learning model on the new data.

Example 23. The system of any of examples 13-22, wherein the database application is a compressed application is decompressed to share the training function and the activation function with the consumer user on the distributed database.

Example 24. The system of any of examples 13-23, wherein the training function and the activation function are secure user-defined functions that are shared with the consumer user on the distributed database.

Example 25. A machine storage medium embodying instructions that, when executed by a machine, cause the machine to perform operations comprising: sharing, on a distributed database, a database application to a consumer user of the distributed database, the database application generated by a provider user of the distributed database, the database application including a machine learning model for training on a training dataset comprising a provider user training dataset, and a consumer user training dataset that include non-overlapping dataset features, the provider user training dataset being encrypted in the database application by an encryption key of the provider user; generating, by the consumer user on the distributed database, a trained machine learning model by training the machine learning model on the provider user training dataset and the consumer user training dataset using the database application, the database application decrypting, using a decryption key, the provider user training data for training the machine learning model; and generating, by the consumer user on the distributed database, one or more outputs from the trained machine learning model by applying the trained machine learning model on new data.

Example 26. The machine storage medium of example 25, wherein the one or more outputs are predictions generated by the trained machine learning model using the new data.

Example 27. The machine storage medium of any of examples 25 or 26, wherein the new data comprises data from a provider user account of the provider user on the distributed database and other data from a consumer user account of the consumer user on the distributed database.

Example 28. The machine storage medium of any of examples 25-27, wherein the consumer user initiates training using a training command that activates the database application on different data portions from the provider user training dataset and the consumer user training dataset.

Example 29. The machine storage medium of any of examples 25-28, wherein the database application is generated on a provider user set of computing devices on the distributed database that are managed by a provider user account of the provider user.

Example 30. The machine storage medium of any of examples 25-29, wherein the consumer user manages a consumer user set of computing devices that are separate from the provider user set of computing devices.

Example 31. The machine storage medium of any of examples 25-30, wherein the provider user training dataset and the consumer user training dataset have different columns of data for rows of the training dataset.

Example 32. The machine storage medium of any of examples 25-31, wherein the provider user training dataset and the consumer user training dataset have columns of data for columns of the training dataset.

Example 33. The machine storage medium of any of examples 25-32, wherein the database application comprises a training function that is shared by the provider user with the consumer user to train the machine learning model.

Example 34. The machine storage medium of any of examples 25-33, wherein the database application comprises an activation function to generate the one or more outputs by applying the trained machine learning model on the new data.

Example 35. The machine storage medium of any of examples 25-34, wherein the database application is a compressed application is decompressed to share the training function and the activation function with the consumer user on the distributed database.

Example 36. The machine storage medium of any of examples 25-35, wherein the training function and the activation function are secure user-defined functions that are shared with the consumer user on the distributed database.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
providing access to a user defined function to be executed in a database system to a first user of a cloud data platform, the user defined function generated by a second user of the cloud data platform, the user defined function comprising a machine learning model for training on a training dataset;
identifying, by at least one hardware processor, a request from the second user to train the machine learning model on a first training dataset and a second training dataset, the first training dataset being encrypted in the user defined function and the second training dataset including non-overlapping dataset features with the first training dataset;
enabling the user defined function to use training data from both the first user and the second user to train the machine learning model;
preventing training data from the first user from being revealed to the second user;
preventing training data from the second user from being revealed to the first user; and
generating one or more outputs from the trained machine learning model by applying the trained machine learning model on new data.

2. The method of claim 1, further comprising:
generating a union of the first training dataset and the second training dataset to create joined dataset based on the first training dataset being encrypted by an encryption key of the first user.

3. The method of claim 2, further comprising:
training the machine learning model on the joined dataset by executing a user-defined function.

4. The method of claim 1, wherein the database system is generated on a first user set of computing devices on the cloud data platform that are managed by a first user account of the first user.

5. The method of claim 4, wherein the second user manages a second user set of computing devices that are distinct from the first user set of computing devices.

6. The method of claim 1, further comprising:
enabling the first user of the cloud data platform to share, with the second user of the cloud data platform, the first training dataset in an encrypted view.

7. The method of claim 1, further comprising:
enabling the first user of the cloud data platform to share one or more user-defined functions of the database system, the one or more user-defined functions configured to access the first training dataset.

8. The method of claim 7, further comprising:
enabling the second user of the cloud data platform to access the one or more user-defined functions shared by the first user of the cloud data platform; and
regenerating the trained machine learning model by training the machine learning model using the one or more user-defined functions accessed by the second user.

9. The method of claim 1, wherein the first user of the cloud data platform and the second user of the cloud data platform correspond to different entities.

10. The method of claim 1, wherein the new data comprises data from a first user account of the first user on the cloud data platform and data from a second user account of the second user on the cloud data platform.

11. A system comprising:
one or more computer processors; and
one or more computer-readable mediums storing instructions that, when executed by the one or more computer processors, cause the system to perform operations comprising:
providing access to a user defined function to be executed in a database system to a first user of a cloud data platform, the user defined function generated by a second user of the cloud data platform, the user defined function comprising a machine learning model for training on a training dataset;
identifying, by at least one hardware processor, a request from the second user to train the machine learning model on a first training dataset and a second training dataset, the first training dataset being encrypted in the user defined function and the second training dataset including non-overlapping dataset features with the first training dataset;
enabling the user defined function to use training data from both the first user and the second user to train the machine learning model;
preventing training data from the first user from being revealed to the second user;
preventing training data from the second user from being revealed to the first user; and
generating one or more outputs from the trained machine learning model by applying the trained machine learning model on new data.

12. The system of claim 11, the operations further comprising:
generating a union of the first training dataset and the second training dataset to create a joined dataset based on the first training dataset being encrypted by an encryption key of the first user.

13. The system of claim 12, the operations further comprising:
training the machine learning model on the joined dataset by executing a user-defined function.

14. The system of claim 11, wherein the database system is generated on a first user set of computing devices on the cloud data platform that are managed by a first user account of the first user.

15. The system of claim 14, wherein the second user manages a second user set of computing devices that are distinct from the first user set of computing devices.

16. The system of claim 11, the operations further comprising:
enabling the first user of the cloud data platform to share, with the second user of the cloud data platform, the first training dataset in an encrypted view.

17. The system of claim 11, the operations further comprising:
enabling the first user of the cloud data platform to share one or more user-defined functions of the database system, the one or more user-defined functions configured to access the first training dataset.

18. The system of claim 17, the operations further comprising:
enabling the second user of the cloud data platform to access the one or more user-defined functions shared by the first user of the cloud data platform; and
regenerating the trained machine learning model by training the machine learning model using the one or more user-defined functions accessed by the second user.

19. The system of claim 11, wherein the first user of the cloud data platform and the second user of the cloud data platform correspond to different entities.

20. The system of claim 11, wherein the new data comprises data from a first user account of the first user on the cloud data platform and data from a second user account of the second user on the cloud data platform.

21. A machine-storage medium embodying instructions that, when executed by a machine, cause the machine to perform operations comprising:
providing access to a user defined function to be executed in a database system to a first user of a cloud data platform, the user defined function generated by a second user of the cloud data platform, the user defined function comprising a machine learning model for training on a training dataset;
identifying, by at least one hardware processor, a request from the second user to train the machine learning model on a first training dataset and a second training dataset, the first training dataset being encrypted in the user defined function and the second training dataset including non-overlapping dataset features with the first training dataset;
enabling the user defined function to use training data from both the first user and the second user to train the machine learning model;
preventing training data from the first user from being revealed to the second user;
preventing training data from the second user from being revealed to the first user; and
generating one or more outputs from the trained machine learning model by applying the trained machine learning model on new data.

22. The machine-storage medium of claim 21, the operations further comprising:
generating a union of the first training dataset and the second training dataset to create a joined dataset based on the first training dataset being encrypted by an encryption key of the first user.

23. The machine-storage medium of claim 22, the operations further comprising:
training the machine learning model on the joined dataset by executing a user-defined function.

24. The machine-storage medium of claim 21, wherein the database system is generated on a first user set of computing devices on the cloud data platform that are managed by a first user account of the first user.

25. The machine-storage medium of claim 24, wherein the second user manages a second user set of computing devices that are distinct from the first user set of computing devices.

26. The machine-storage medium of claim 21, the operations further comprising:
   enabling the first user of the cloud data platform to share, with the second user of the cloud data platform, the first training dataset in an encrypted view.

27. The machine-storage medium of claim 21, the operations further comprising:
   enabling the first user of the cloud data platform to share one or more user-defined functions of the database system, the one or more user-defined functions configured to access the first training dataset.

28. The machine-storage medium of claim 27, the operations further comprising:
   enabling the second user of the cloud data platform to access the one or more user-defined functions shared by the first user of the cloud data platform; and
   regenerating the trained machine learning model by training the machine learning model using the one or more user-defined functions accessed by the second user.

29. The machine-storage medium of claim 21, wherein the first user of the cloud data platform and the second user of the cloud data platform correspond to different entities.

30. The machine-storage medium of claim 21, wherein the new data comprises data from a first user account of the first user on the cloud data platform and data from a second user account of the second user on the cloud data platform.

* * * * *